United States Patent
Harvey et al.

[11] Patent Number: 5,843,507
[45] Date of Patent: Dec. 1, 1998

[54] STEAM-PEELING METHODS

[75] Inventors: Michael S. Harvey; Donald P. Jepson, both of Modesto, Calif.

[73] Assignee: Enviro Tech Chemical Services, Inc., Modesto, Calif.

[21] Appl. No.: 751,441

[22] Filed: Nov. 18, 1996

Related U.S. Application Data

[60] Division of Ser. No. 501,695, Jul. 12, 1995, which is a continuation-in-part of Ser. No. 353,130, Dec. 9, 1994, abandoned.

[51] Int. Cl.$^6$ ................................ A23L 1/10; A23N 7/00
[52] U.S. Cl. .................... 426/482; 426/481; 426/447; 426/509; 426/511; 99/472; 99/479; 99/516; 99/534; 99/584
[58] Field of Search ...................... 426/481, 482, 426/447, 509, 511; 99/467, 470, 472, 483, 516, 534, 537, 540, 567, 568, 584

[56] References Cited

U.S. PATENT DOCUMENTS

| | | | |
|---|---|---|---|
| 2,847,334 | 8/1958 | Kilburn et al. | 426/287 |
| 4,091,722 | 5/1978 | Kunz | 99/479 |
| 4,092,910 | 6/1978 | Gennchev et al. | 99/472 |
| 4,125,066 | 11/1978 | Stokes | 99/534 |
| 4,321,863 | 3/1982 | Dimov et al. | 99/470 |
| 4,524,681 | 6/1985 | Harris et al. | 99/474 |
| 4,562,772 | 1/1986 | Battistini | 99/472 |
| 4,671,965 | 6/1987 | Harris et al. | 426/482 |
| 5,046,411 | 9/1991 | le Grand et al. | 99/472 |

Primary Examiner—Laurie A. Scheiner
Attorney, Agent, or Firm—Joseph E. Gerber

[57] ABSTRACT

A method of peeling tomatoes with the disclosed machine includes passing tomatoes through the steam chamber and maintaining a steam-controlled temperature of approximately 220°–290° F. and a pressure of 12–30 psi. The level of condensate is controlled for dragout by adding water and the concentration of naphthalene sulfonate is monitored and maintained at approximately 1000–2000 ppm. Residence time in the steam chamber is 8–35 seconds, while residence time in the vacuum chamber is 5–10 seconds while maintaining a vacuum of approximately 16–26 in. Hg at approximately 75°–90° F.

29 Claims, 1 Drawing Sheet

STEAM-PEELING METHODS

This is a division of application Ser. No. 08/501,695 filed Jul. 12, 1995, which is a continuation-in-part of application Ser. No. 08/353,130 filed Dec. 9, 1994, now abandoned.

BACKGROUND OF THE INVENTION

1. Field of the Invention

The present invention relates generally to methods and apparatus for peeling agricultural produce, and more specifically to improved methods and apparatus for steam-peeling tomatoes. However, these methods and apparatus may be applied to peeling other fruits and vegetables, as well, especially those having skin structures similar to those of tomatoes.

2. Description of the Related Art

Current tomato peeling methods are of two general types: lye peeling and steam peeling. Lye peeling employs caustic solution to remove tomato skins, and the whole-tomato product recovery can be as high as 90%. But, lye is expensive and dangerous, and its reactivity limits the useful life of processing equipment. Further, the by-products of lye-peeled tomatoes remain caustic and therefore must be either pH-adjusted and mixed with other food adjuvants, or discarded as unusable waste.

Steam peeling subjects the fruit to pressurized steam in loosening a tomato's skin, and has the advantage that virtually all of the by-products of the process are edible and useable in catsup and other consumables. Indeed, when the total output of the steam peeling process is assessed, including both whole tomatoes and by-products, fully 95% or more of the tomato input is recoverable with this process. However, despite claims of apparatus manufacturers, whole-tomato product recovery from conventional steam-peeling apparatus seldom exceeds 40%. And, product throughput for any given commercially-available apparatus is generally limited to an established number of tons per hour, above which, peeling efficiency is lost. For example, in the apparatus to which the invention herein has been applied and used with success, the Food Machinery Corporation (FMC) Model SP-20 Tomato Steam Peeler, the generally-recognized upper limit of continuous throughput for the unmodified apparatus is approximately 23 to 24 tons per hour in peeling, for example, the "Brigade," a common tomato variety. However, a continuous throughput of only 18 to 20 tons per hour is more-realistically attainable with the unmodified FMC Model SP-20. Higher throughputs from this and similar machines would certainly be desirable.

Further, the unmodified FMC SP-20 peels the Brigade tomato most efficiently at a temperature of approximately 300° F., and at a steam pressure of about 25 psi. However, it is expensive to generate high temperatures and steam pressures, and high temperatures and pressures degrade product quality (i.e. flesh consistency and color) and reduce whole tomato product recovery. Thus, it would be very advantageous for tomato processors to have the ability to operate the FMC SP-20 and similar commercial apparatus at lower temperatures and pressures without a significant loss of throughput, product quality or whole-tomato product recovery. And, it would be a further benefit if, when desired, higher throughputs could be achieved at common operating temperatures and pressures while continuing to maintain established standards of product quality and the percentage of whole-tomato recovery.

Thus, it appears that a need exists for a tomato peeling method and apparatus which permit a processor to select for better product quality and/or recovery of more whole, useable fruit in comparison to what is currently available with conventional steam peeling methods and apparatus. And, it would be advantageous if this could be achieved by operating at lower temperatures and pressures, and/or at higher rates of product throughput, without producing tainted by-products.

SUMMARY OF THE INVENTION

The improved steam-peeling method and apparatus of the present invention are adapted to overcome the above-noted shortcomings and to fulfill the stated needs. The inventive method comprises the steps of treating a tomato with steam from an aqueous solution of a cuticle integrity-reducing substance, such as the naphthalene sulfonate surfactants PETRO®AA or PETRO®BA, at a pressure greater than ambient atmospheric pressure and then, afterward, subjecting the tomato to a pressure less than ambient atmospheric pressure.

The inventive method may in addition, or in the is alternative, include treating a plurality of tomatoes with a surface-lubricating substance such as one of the aforementioned surfactants, while driving those tomatoes through a steam condensate at a pressure greater than ambient atmospheric pressure and then, afterward, subjecting those tomatoes to a pressure less than ambient atmospheric pressure.

The inventive apparatus comprises a steam chamber; a fluid delivery conduit connected between the steam chamber and a water source; a chemical reservoir containing an aqueous solution of a cuticle integrity-reducing and preferably surface lubricating, substance in fluid communication with the steam chamber; and, a vacuum chamber.

It is known that conventional steam peeling effects separation of a tomato's skin from its underlying flesh by first, in the steam chamber, raising a tomato's skin temperature to a point where pockets of superheated liquid form therebeneath. Then, by quickly passing the tomato to a low-temperature, negative-pressure environment, the superheated liquid beneath the skin is caused to vaporize instantly and explosively, thereby causing separation of the skin from the tomato's underlying flesh.

It is also known that a protective cuticle layer covers a tomato's skin, and that this cuticle layer is comprised of cutin (a polymer of long-chain fatty acids) as well as a mixture of natural waxes.

Although the reasons for the superior results yielded in practicing the invention are not yet definitively known, it is hypothesized here that a tomato's intact cuticle layer has a significant insulating effect which slows the formation of steam pockets therebeneath. Thus, it would appear that if the insulating character of this cuticle could be decreased, then temperature, pressure and residence time within the steam chamber could be reduced without loss of peeling efficiency.

It is further hypothesized that the surfactant substances employed herein, when carried in a steam-borne form at high pressure, quickly begin to disrupt and dissolve this cuticle layer, making it thinner and thereby greatly decreasing the skin's insulating character. Further, the surfactants are thought to break down the surface tension in water and steam droplets, thereby permitting better wetting of the skin with condensate and steam, and increasing the efficiency of heat exchange through the skin. These factors would likely permit more rapid and efficient formation of pockets of superheated liquid beneath the skin of a tomato so treated, and would therefore promote more rapid and efficient peel separation upon transfer of such tomato to a vacuum chamber. Indeed, in practice, this theory appears consistent with observed experimental results.

Although the forgoing theories of action cannot yet be proven, it appears that, in any case, the superior results are at least in some way dependent upon some reduction of the integrity of the tomato skin's cuticle layer.

It is also observed that the preferred surfactants effectively lubricate the surfaces of tomatoes treated therewith. As frictional binding between adjacent tomatoes is one factor which appears to reduce steam peeling efficiency at higher product throughputs, and as the disclosed and claimed surfactants reduce such frictional binding, it appears that the superior results of the inventive method are to some extent dependent upon the surface-lubricating character of the surfactants chosen.

Thus, it is an object of the present invention to provide a method for peeling tomatoes which results in increased whole-tomato product recovery and edible by-products.

It is another object of the present invention to provide a method of steam-peeling tomatoes which utilizes lower temperatures and steam pressures, without reducing product throughput and peeling efficiency.

It is a further object of the present invention to provide a method of steam-peeling tomatoes which permits higher product throughput without increasing steam pressure and temperature, and without reducing product recovery and product quality.

It is yet a further object of the present invention to provide a method of steam-peeling tomatoes which avoids the use of caustic chemicals.

Still further objects of the inventive steam peeling apparatus disclosed herein will be apparent from the drawing figure and following detailed description thereof.

DESCRIPTION OF THE PREFERRED EMBODIMENTS

Figure 1:
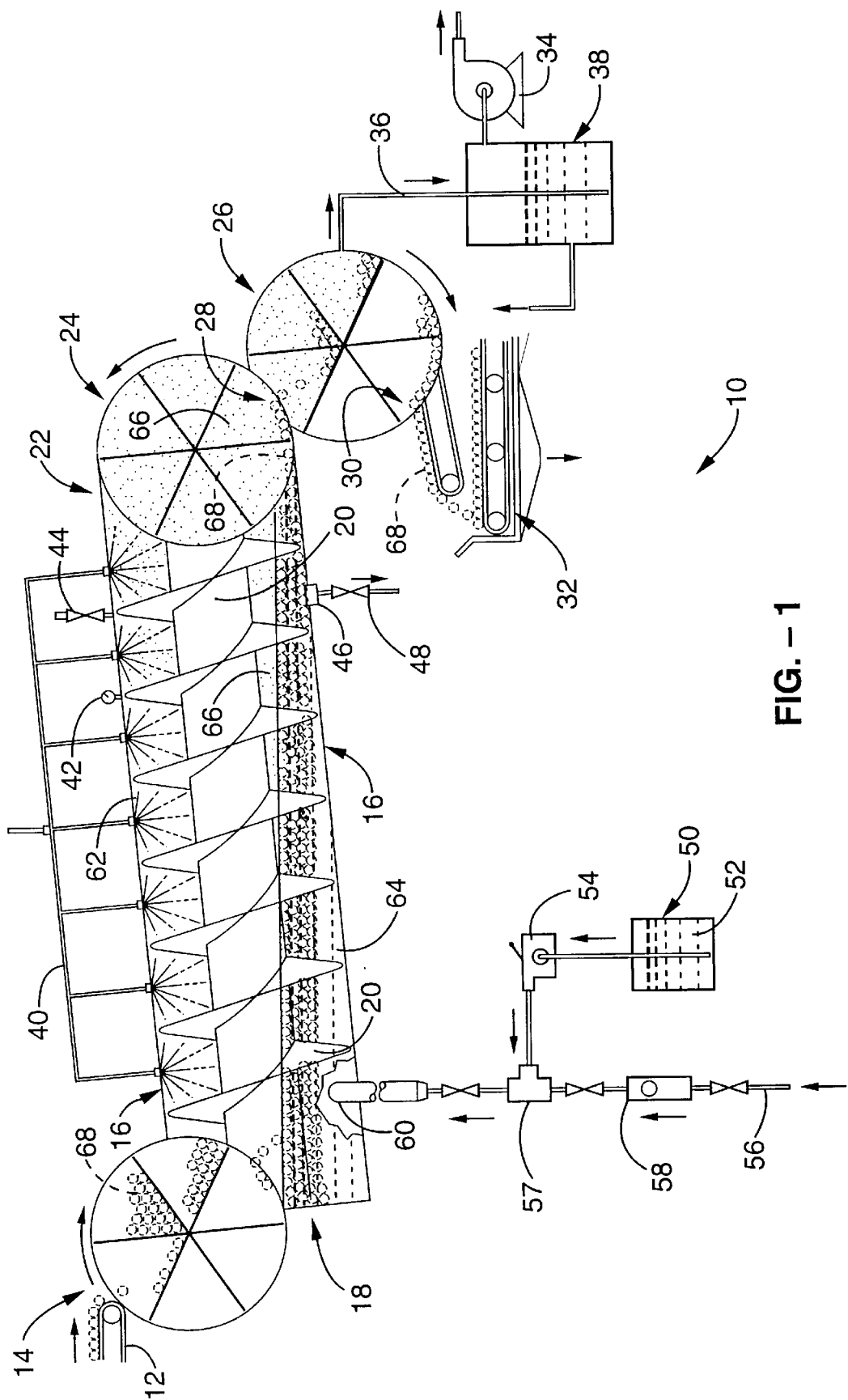
FIG. 1 is a diagrammatic representation of the apparatus of the invention.

Referring now to the drawing FIGURE, the apparatus of the invention is therein diagrammatically represented, said apparatus being identified generally herein with reference numeral 10. Apparatus 10 is a combination of elements comprised, most expediently, of a conventional, currently-available tomato steam peeler modified by the addition of means for controlled introduction of a cuticle integrity-reducing surfactant to the peeler's steam chamber. In practicing the invention, a modified (FMC) Model SP-20 Tomato Steam Peeler has been used with success. However, it is expected that other commonly-available steam peelers such as the 40 ton per hour (tph) model manufactured by Imdec S. A. and the 12 tph model manufactured by Rossi-Catelli as well as others, when modified and operated as herein described, may yield equally satisfactory results.

Apparatus 10 first comprises product input conveyor 12 which may conveniently be of the type known as a feed elevator, or the like. Input conveyor 12 terminates at a pressure-tight rotary input "star" valve 14 at steam chamber 16's upstream end 18. As is well-known in the art, input valve 14 comprises a rotary turret provided with a plurality of pockets adapted, successively, to register with an opening between the input valve housing and steam chamber 16.

Steam chamber 16 is a generally cylindrical pressure-tight vessel having a feed screw 20 concentrically disposed therewithin. Steam chamber 16 is inclined slightly upward, its upstream end 18 being disposed somewhat below its downstream end 22. Feed screw 20 is power-driven by conventional means, and is so constructed and operated as to promote product flow in a downstream direction, away from input valve 14.

A second pressure-tight rotary star valve, output valve 24, is provided adjacent steam chamber 16's downstream end 22. Output valve 24 comprises a rotary turret provided with a plurality of pockets adapted, successively, to register with an opening between the output valve housing and vacuum chamber 26.

Vacuum chamber 26 comprises yet another pressure-tight housing having a pocketed, rotary turret therewithin. The housing of vacuum chamber 26 has a product inlet port 28 in communication with steam chamber 16's output valve 24. Vacuum chamber 26's housing also has a product outlet port 30 from which product is passed to mechanical means commonly called a "scrubber" 32 adapted to remove a tomato's skin, once loosened. A sealed portion of vacuum chamber 26 between its inlet and outlet ports, 28 and 30, is in communication with vacuum pump 34 via vacuum line 36 and condensing chamber 38.

Raw steam, generated from a potable water source, is delivered to steam-chamber 16 via steam manifold 40. Steam input may be either manually or automatically controlled.

A steam pressure gauge 42, and a selectively adjustable pressure release valve 44, permit an operator to maintain the steam pressure, and consequently the temperature, within steam chamber 16 at any desired maxima.

Steam chamber 16 is further outfitted with a fluid level sensor 46 and companion drain valve 48 which, together, operate to maintain the condensate within steam chamber 16 at a predetermined level.

Adjacent steam chamber 16 stands a chemical reservoir 50 containing a cuticle integrity-reducing surfactant 52 having the specialized properties discussed below. Reservoir 50, through pump 54, is in fluid communication with a potable water supply line 56 at injector 57. Water line 56 includes a flow meter 58 and is connected to steam chamber 16 at a fluid port 60 below steam chamber 16's minimum condensate level. A water line of 0.25 inch diameter and a flow rate of 0.5 to 3 gallons per minute has been found satisfactory for the purposes herein described.

In order to practice the invention effectively, cuticle integrity-reducing surfactant 52 in reservoir 50 should have a high vaporization potential in an aqueous solution. Further, it should be nonreactive with other chemical species and retain its molecular integrity up to at least 290° F. Yet further, it should have a surface-lubricating property when applied to a tomato which reduces frictional binding between adjacent tomatoes as they are driven through a steam peeler. Only two cuticle integrity-reducing surfactants have been found, so far, to fit these parameters. Both are anionic, and both are classified as mixed methyl naphthalene sodium sulfonates. The preferred is currently sold under the product name PETRO®AA by Witco Corporation, 520 Madison Avenue, New York, N.Y. 10022. Product literature describes PETRO®AA's ingredients as polyalkyl naphthalene sodium sulfonate. Witco's product PETRO®BA, also a mixed methyl naphthalene sodium sulfonate, is the other surfactant found to exhibit the desired qualities, this having also been used with success in practicing the invention. PETRO®BA's ingredients are reported to be sulfonated naphthalene sodium salt.

PETRO®AA and PETRO®BA both exhibit the known surfactant qualities of all naphthalene sulfonates. However, PETRO®AA and PETRO®BA have been discovered here to disrupt a tomato's cuticle in much lower condensate concentrations than other naphthalene sulfonates. And, most surprisingly, PETRO®AA and PETRO®BA appear to be not only present, but stable and active, in the vapor phase of the biphasic steam chamber environment. This is thought to be because PETRO®AA and PETRO®BA appear to have unusually high vaporization potentials when compared with other naphthalene sulfonates. Although not known for certain at this time, it is hypothesized that these high vaporization potentials are attributable to the molecular weights of PETRO®AA and PETRO®BA which are 260 and 245, respectively.

It is to be understood that chemical species of which PETRO®AA and PETRO®BA are comprised are currently thought to be the best suited to the practice of the invention. However, other now-known or later-discovered surfactants or other substances may be found to exhibit those similar essential qualities of cuticle integrity-reducing capability, high vaporization potential, and molecular stability up to at least 290° F. Such substance would also preferably have a product surface-lubricating capability.

In practicing the method of the invention, process conditions within the closed environment of the inventive apparatus such as temperature, pressure, residence time and cuticle integrity-reducing surfactant concentration may be adjusted to, and stabilized at, particular values to achieve a variety of desired end results. A general description of the inventive method including the range of the several variable conditions first follows, and examples are presented thereafter.

The general method of the invention employs the above-described apparatus 10 and begins with the step of partially filling steam chamber 16 with a volume of a dilute aqueous solution of cuticle integrity-reducing surfactant. Potable water is delivered via water line 56 through flow meter 58 while concentrated surfactant 52 is delivered from reservoir 50, through pump 54, and into water line 56 via injector 57. The resulting dilute solution is delivered to the interior of steam chamber 16 through fluid port 60.

If either PETRO®AA or PETRO®BA are employed as cuticle integrity-reducing surfactant 52, these are available either as aqueous liquids in concentrations of 50% by weight, or as powders, each such powder being easily mixed with water to yield a 50% solution in reservoir 50. Upon further diluting surfactant 52 at injector 57, the initial concentration delivered through port 60 is preferably approximately 1000 to 2000 ppm, although improved results in comparison with standard steam-peeling methods can be observed at concentrations of PETRO®AA or PETRO®BA as low as 500 ppm.

Next, as raw steam 62 is introduced to steam chamber 16 via steam manifold 40, input valve 14 and feed screw 20 are operated in order to agitate and heat the initial volume of dilute cuticle integrity-reducing surfactant solution. At the outset, depending upon variables in the intended product input and upon results desired, the temperature within steam chamber 16 is adjusted to between 220° F. to 290° F. This temperature range corresponds to a pressure range of approximately 12 to 30 psi. Steam pressure is monitored at gauge 42, maximum pressure being selectively controlled with valve 44. Ultimately, stable conditions are attained within steam chamber 16 wherein liquid condensate phase 64 and vaporous, steam-borne surfactant phase 66 reach equilibrium.

The initial volume of condensate 64 within steam chamber 16 is preferably from one-quarter to one-half of chamber 16's total volume. Best results are achieved when the upper surface of condensate 64 at steam chamber 16's upstream end 18 is such that input star valve 14 is submerged no more than just slightly above half its overall height.

A vacuum of 16 to 26 in. Hg is set and maintained within vacuum chamber 26, wherein the temperature range should be 75° to 90° F., or so, depending upon variables in the product input.

Once each aforedescribed adjustable process condition is attained and stabilized at a value consistent with the end results desired, the step of delivering raw, fresh tomatoes 68 via input conveyor 12, through input valve 14 and into steam chamber 16 may be undertaken. Throughput may range anywhere between 20 to 40 tph, as desired.

Input valve 14 delivers tomatoes 68 into steam chamber 16 at a point which is below the surface of the heated condensate 64. Thus, tomatoes 68 are initially thoroughly covered with the cuticle integrity-reducing surfactant present in the condensate. Feed screw 20 drives the floating tomatoes 68 upward and out of condensate 64, and toward output valve 24.

During the continuation of their passage through steam chamber 16, tomatoes 68 are subjected to steam-borne, cuticle integrity-reducing surfactant vapors 66 at high pressure. The residence time of a tomato 68 in steam chamber 16 is generally 10 to 35 seconds, or so. And, as is common in the art, this residence time is adjusted to achieve the most effective, efficient peeling of tomatoes of different varieties and different degrees of ripeness, as well as to accommodate other variables in the product input such as throughput volume and initial product temperature.

Next, tomatoes 68 are passed into output star valve 24 where, as they are in turn delivered into vacuum chamber 26, they are subjected to negative pressure at approximately ambient temperature. This sudden change in temperature and pressure causes pockets of superheated liquid beneath the tomatoes' skins to explode instantly into vapor, thus separating the skins from the tomatoes' flesh therebeneath. As negative pressure is maintained in vacuum chamber 26 by vacuum pump 34, steam-borne cuticle integrity-reducing surfactant vapors 66 are drawn off through vacuum line 36 and condensed in condensing chamber 38 for disposal. As long as a sufficient negative pressure is maintained in vacuum chamber 26, all significant traces of cuticle integrity-reducing surfactant are drawn off the product as vapor. Indeed, this action appears so efficient as to make any follow-up potable water rinse unnecessary.

Tomatoes 68 exit vacuum chamber 26 via outlet port 30 and pass to scrubbers 32 for mechanical removal of their loosened skins.

It will be understood that once the desired operating conditions are established within steam peeling apparatus 10, these conditions will need to be maintained in order to preserve a consistent level of peeling efficiency. For example, as fresh ambient-temperature tomatoes are passed into steam chamber 16, they tend to lower the temperature of both the condensate phase 64 and the vapor phase 66, therein. Consequently, it is necessary to continue introducing raw steam 62 into chamber 16 to maintain optimum operating temperatures and pressures. Thus, maintenance requires regular sampling of chamber 16's temperature and pressure, and either pulsed or continuous introduction of live steam thereto.

Further, as tomatoes 68 pass from steam chamber 16 into condensing chamber 26 they slowly deplete the volume of condensate 64 in chamber 16; this is known in the art as "dragout." It is common practice to compensate for dragout by infusing a corresponding volume of steam or liquid water to the steam chamber to maintain the condensate at the desired level. However, here, the concentration of the cuticle integrity-reducing surfactant in condensate 64 is also subject to depletion by dragout, and must therefore also be regularly sampled and appropriately supplemented via port 60 to maintain its optimum concentration.

The ongoing sampling of temperature, pressure, condensate volume and cuticle integrity-reducing surfactant concentration, as well as the ongoing correction thereof by supplemental infusion of steam, water and surfactant, respectively, may be carried out by either manual or automatic means. Thus, by this sampling and supplementation, equilibrium within steam chamber 16 is maintained.

In general it will be found that in the practice of the inventive method with the apparatus herein, maintenance of higher temperatures and pressures within steam chamber 16 will permit throughput to be increased and/or residence time to be reduced. This general relationship is well known in the use of conventional steam peeling apparatus and methods, although when such conventional apparatus and methods are modified in accordance with the instant disclosure, higher throughputs, lower temperatures and pressures, and shorter steam chamber residence times are possible without sacrificing qualitative or quantitative results. For instance, as illustrated in the first example below, an FMC SP-20 machine modified and operated as described herein is able to yield a higher total throughput than was previously available from an unmodified machine. In contrast, the second example shows that while a standard level of throughput is maintained, heretofore unequaled economy may be achieved by maintaining temperatures and pressures in the steam chamber at levels significantly lower than previously necessary.

Specifically, Example I, below, illustrates the increased total throughput of the Brigade tomato achievable from an FMC SP-20 machine modified as described herein, in comparison with an unmodified FMC SP-20 machine.

| Variables | Standard FMC SP-20 | Modified FMC SP-20 |
|---|---|---|
| Tomato variety | Brigade | Brigade |
| Steam chamber temperature (°F.) | 267 | 267 |
| Steam chamber pressure (psi) | 25 | 25 |
| Steam chamber residence time (sec) | 30–40 | 15–25 |
| PETRO AA or PETRO BA [C] (ppm.) | 0 | 2000 |
| Vacuum chamber temperature (°F.) | 80 | 80 |
| Vacuum chamber vacuum (in. Hg) | 20–24 | 20–24 |
| Vacuum chamber residence time (sec) | 5–10 | 5–10 |
| Total throughput (tph) | 20–25 | 30–38 |
| Recovery of total throughput (%) | 96–97 | 97–98 |
| Recovery of whole tomato product (%) | 40 | 42 |
| Color of whole tomato product | orange-red | red |

And, Example II below shows that, with lower steam chamber temperature and pressure, an FMC SP-20 machine modified as described herein is able to achieve the same total throughput of Brigade tomatoes as an unmodified FMC SP-20 using higher steam chamber temperature and pressure.

| Variables | Standard FMC SP-20 | Modified FMC SP-20 |
|---|---|---|
| Tomato variety | Brigade | Brigade |
| Steam chamber temperature (°F.) | 267 | 252 |
| Steam chamber pressure (psi) | 25 | 16 |
| Steam chamber residence time (sec) | 30 | 8–10 |
| PETRO AA or PETRO BA [C] (ppm.) | 0 | 2000 |
| Vacuum chamber temperature (°F.) | 80 | 80 |
| Vacuum chamber vacuum (in. Hg) | 20–24 | 20–24 |
| Vacuum chamber residence time (sec) | 5–10 | 5–7 |
| Total throughput (tph) | 25 | 25 |
| Recovery of total throughput (%) | 96–97 | 98 |
| Recovery of whole tomato product (%) | 40 | 45 |
| Color of whole tomato product | orange-red | red |

It should be understood that if existing steam peeling machines such as the FMC SP-20 are modified as herein disclosed to permit practice of the invention, some additional modifications may be required, as well, to permit enjoyment of the full benefits thereof. For example, as the drive train of the unmodified FMC SP-20 permits a maximum fresh tomato throughput of 25 tons per hour (tph), it will likely be necessary to replace a sprocket or another drive train component to permit the 38 tph throughput of which the modified machine is capable.

The foregoing detailed disclosure of the inventive apparatus 10, as well as the inventive method, are considered as only illustrative of the preferred embodiments of, and not limitations upon the scope of, the invention. Those skilled in the art will envision many other possible variations of the structure and steps disclosed herein that nevertheless fall within the scope of the following claims. And, alternative uses for the apparatus and method disclosed and claimed may later be realized. Accordingly, the scope of the invention should be determined with reference to the appended claims, and not by the examples which have herein been given.

I claim:

1. A method for removing skin from an article of agricultural produce, comprising the steps of:
   a. treating said article with naphthalene sulfonate and steam at a pressure greater than ambient atmospheric pressure; and,
   b. quickly thereafter, subjecting said article to a pressure less than ambient atmospheric pressure.

2. The method of claim 1, wherein said naphthalene sulfonate has a molecular weight of approximately 260.

3. The method of claim 1, wherein said naphthalene sulfonate has a molecular weight of approximately 245.

4. The method of claim 1, wherein said naphthalene sulfonate is a mixed methyl naphthalene sodium sulfonate.

5. The method of claim 1, wherein said naphthalene sulfonate is a polyalkyl naphthalene sodium sulfonate.

6. The method of claim 1, wherein said naphthalene sulfonate is a sulfonated naphthalene sodium salt.

7. The method of claim 1, wherein an aqueous solution of said naphthalene sulfonate is capable of reducing the integrity of said article's cuticle.

8. The method of claim 1, wherein said article's skin has an insulating character and wherein an aqueous solution of said naphthalene sulfonate is capable of reducing said skin's insulating character.

9. The method of claim 1, wherein an aqueous solution of said naphthalene sulfonate is capable of lubricating the surface of said article.

10. A method for removing skin from an article of agricultural produce, comprising the steps of:

a. treating said article with cuticle integrity-reducing substance and steam at a pressure greater than ambient atmospheric pressure; and, b. quickly thereafter, subjecting said article to a pressure less than ambient atmospheric pressure.

11. The method of claim 10, wherein said cuticle integrity-reducing substance is a cutin-dissolving substance.

12. The method of claim 10, wherein said cuticle integrity-reducing substance is able to reduce an insulating character of said article's skin.

13. The method of claim 10, wherein said cuticle integrity-reducing substance is a surfactant.

14. The method of claim 10, wherein said cuticle integrity-reducing substance is also a surface-lubricating substance.

15. The method of claim 10, wherein said cuticle integrity-reducing substance is a naphthalene sulfonate.

16. The method of claim 10, wherein said cuticle integrity-reducing substance is a naphthalene sulfonate having a molecular weight of approximately 260.

17. The method of claim 10, wherein said cuticle integrity-reducing substance is a naphthalene sulfonate having a molecular weight of approximately 245.

18. The method of claim 10, wherein said cuticle integrity-reducing substance is a mixed methyl naphthalene sodium sulfonate.

19. The method of claim 10, wherein said pressure greater than ambient atmospheric pressure is approximately 12–30 psi.

20. The method of claim 10, wherein said article is subjected to pressure of approximately 12–30 psi for approximately 8–35 seconds.

21. The method of claim 10, wherein said article is further subjected to a temperature of approximately 220°–290° F. while being subjected to a pressure greater than ambient atmospheric pressure.

22. The method of claim 10, wherein said article is subjected to a temperature of approximately 220°–290° F. for approximately 8–35 seconds.

23. The method of claim 10, wherein said pressure less than ambient atmospheric pressure is approximately 16–26 in. Hg.

24. The method of claim 10, wherein said pressure less than ambient atmospheric pressure is maintained for approximately 5 to 10 seconds.

25. The method of claim 10, wherein, while said article is subjected to a pressure less than ambient atmospheric pressure, said article is also subjected to a temperature of approximately 80° F.

26. A method for peeling a tomato, comprising the steps of:

a. subjecting said tomato to a first environment comprising steam from an aqueous solution of cuticle integrity-reducing substance at a temperature of approximately 220°–290° F. and at a pressure of approximately 12–30 psi for approximately 8–35 seconds; and, b. quickly thereafter, subjecting said tomato to a second environment comprising negative pressure of approximately 16–26 in. Hg at approximately 75°–90° F.

27. A method for peeling a tomato, comprising the steps of:

a. subjecting said tomato to a first environment comprising steam from an aqueous solution of 1000–2000 ppm of naphthalene sulfonate at a temperature of approximately 220°–290° F., at a pressure of approximately 12–30 psi, for approximately 8–35 seconds; and, b. subjecting said tomato to a second environment comprising negative pressure of approximately 16–26 in. Hg at approximately 75°–90° F.

28. A method for peeling a continuous stream of tomatoes, comprising the steps of:

a. subjecting said tomatoes to a first environment comprising an aqueous solution of surface-lubricating substance at a temperature of approximately 220°–290° F. and at a pressure of approximately 12–30 psi for approximately 8–35 seconds; and, b. quickly thereafter, subjecting said tomatoes to a second environment comprising negative pressure of approximately 16–26 in. Hg at approximately 75°–90° F.

29. A method for peeling a continuous stream of tomatoes, comprising the steps of:

a. passing said stream from a conveyor, through a valve, and into a pressure chamber;

b. passing said stream from said pressure chamber, through a valve and into a vacuum chamber;

c. passing said stream from said vacuum chamber to mechanical peeling apparatus;

d. maintaining a biphasic environment within said pressure chamber, a first phase of which comprises an aqueous solution of cuticle integrity-reducing substance and a second phase of which is vapor;

e. maintaining a temperature within said pressure chamber of approximately 220°–290° F.;

f. maintaining a pressure within said pressure chamber of approximately 12–30 psi;

g. controlling the rate of passage of said stream of tomatoes through said pressure chamber such that a tomato in said stream resides within said pressure chamber for approximately 8–35 seconds;

h. maintaining a concentration of cuticle integrity-reducing substance of 1000–2000 ppm; and, i. maintaining a vacuum in said vacuum chamber of approximately 16–26 in. Hg at approximately 75°–90° F.

* * * * *